US008751057B2

(12) United States Patent
Tan

(10) Patent No.: US 8,751,057 B2
(45) Date of Patent: Jun. 10, 2014

(54) COMPUTING DEVICE AND METHOD FOR CONTROLLING TEMPERATURE THEREOF

(75) Inventor: Zeu-Chia Tan, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 781 days.

(21) Appl. No.: 12/979,346

(22) Filed: Dec. 28, 2010

(65) Prior Publication Data
US 2011/0320062 A1    Dec. 29, 2011

(51) Int. Cl.
*G05D 23/00*    (2006.01)

(52) U.S. Cl.
USPC .................. 700/300; 700/276; 700/278

(58) Field of Classification Search
USPC .......... 700/276–278, 299, 300, 302; 361/690, 361/695
See application file for complete search history.

(56) References Cited

U.S. PATENT DOCUMENTS

| | | | |
|---|---|---|---|
| 6,283,380 B1* | 9/2001 | Nakanishi et al. | 236/49.3 |
| 2004/0065268 A1* | 4/2004 | Terrell et al. | 119/448 |
| 2008/0024983 A1* | 1/2008 | Anderl et al. | 361/695 |
| 2008/0067167 A1* | 3/2008 | Sung et al. | 219/448.17 |
| 2011/0234368 A1* | 9/2011 | Huang | 340/3.44 |

* cited by examiner

*Primary Examiner* — Mohammad Ali
*Assistant Examiner* — Nathan Laughlin
(74) *Attorney, Agent, or Firm* — Novak Druce Connolly Bove + Quigg LLP

(57) ABSTRACT

A method for control a temperature of a computing device detects a first CPU temperature $T_{N1}$ using a thermal sensor, controls the fan to swivel from an angle corresponding to the initial cooling location to an angle corresponding to a new cooling location according to a preset swiveling angle of the fan to cool the CPU according to a preset initial rotational speed if the $T_{N1}$ is not less than a preset maximum temperature $T_{max}$ of the CPU, detects a second CPU temperature $T_{N2}$ using the thermal sensor if the cooling time of the fan at the initial rotational speed is equal to the preset cooling time. The method controls the fan to swivel from the angle corresponding to the new cooling location to the angle corresponding to the initial cooling location according to the swiveling angle of the fan if the $T_{N2}$ is less than the $T_{max}$.

6 Claims, 3 Drawing Sheets

COMPUTING DEVICE AND METHOD FOR CONTROLLING TEMPERATURE THEREOF

BACKGROUND

1. Technical Field

Embodiments of the present disclosure relate to temperature control technology, and more particularly to a computing device and a method for controlling a temperature of the computing device.

2. Description of Related Art

Computing devices may include a central processing unit (CPU), an electric fan located on the CPU, a memory device, or other components, which usually generate a lot of heat while working. Overheating of a computing device (e.g., a computer) may lead to data loss or even damage to the computing device. Currently, temperature sensors and electric fans are coupled to the CPU for heat dispersion of the computing device. The temperature sensors measure the temperature of the computing device, while the electric fans are controlled to run at different rotational speeds. However, although the rotational speed of the electronic fans is increased, the heat dispersion of computing device is not improved and the electric fans may make more noise.

DETAILED DESCRIPTION

The processes described may be embodied in, and fully automated via, functional modules executed by one or more general purpose processors. The functional modules may be stored in any type of computer-readable medium or other computer storage device. Some or all of the methods may alternatively be embodied in specialized computer hardware or communication apparatus.

Figure 1:
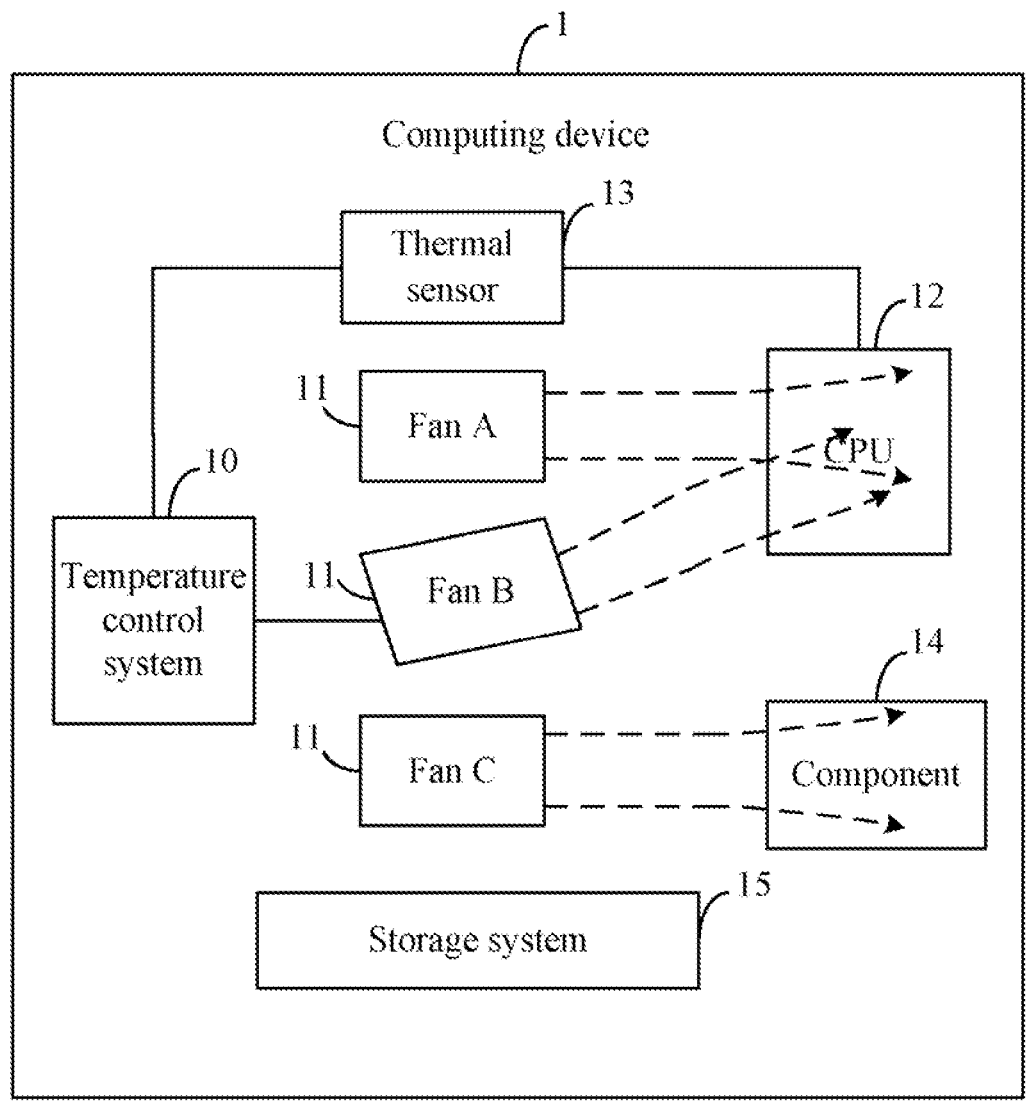
FIG. 1 is a block diagram of one embodiment of a computing device comprising a temperature control system.

FIG. 1 is a block diagram of one embodiment of a computing device 1 including a temperature control system 10. In some embodiments, the temperature control system 10 is included in and controlled by the computing device 1, and can automatically control a temperature of working components of the computing device 1.

The computing device 1 may further include one or more fans 11, a central processing unit (CPU) 12, a thermal sensor 13, one or more components 14 (only one shown in FIG. 1), and a storage system 15. It should be understood that FIG. 1 illustrates only one example of the computing device 1, and may include more or fewer components than illustrated, or a different configuration of the various components in other embodiments. In one embodiment, the computing device 1 may be a desktop computer, a notebook computer, a server, a workstation, or any data computing device.

The fans 11 may be electronically coupled to the CPU 12, the components 14, and/or other components not shown in FIG. 1 for heat dispersion of the components. In one embodiment, the fans 11 may include a fan A, a fan B, and a fan C. In one example, the fan A is stationary (may not swivel), and is mainly used for heat dispersion of the CPU 12. The fan B may swivel (e.g., swivel/rotate about a pivot point) under control of the temperature control system 10, and is mainly used for heat dispersion of the CPU 12. The fan C is stationary (may not swivel), and is mainly used for heat dispersion of the components 14. The thermal sensor 13 is used to detect and measure the temperature of the CPU 12. In one embodiment, the storage system 15 may be an internal storage device, such as a random access memory (RAM) for temporary storage of information, and/or a read only memory (ROM) for permanent storage of information. In some embodiments, the storage system 15 may also be an external storage device, such as an external hard disk, a storage card, or a data storage medium.

Figure 2:
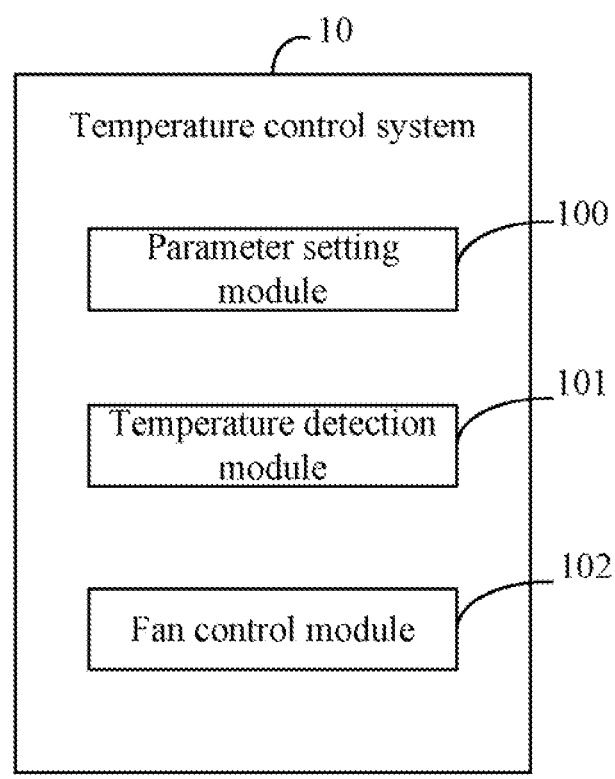
FIG. 2 is a block diagram showing one embodiment of functional modules of the temperature control system of FIG. 1.

FIG. 2 is a block diagram of the temperature control system 10 of FIG. 1. In one embodiment, the temperature control system 10 may include a parameter setting module 100, a temperature detection module 101, and a fan control module 102. In some embodiments, the modules 100, 101, and 102 may comprise computerized code in the form of one or more programs that are stored in the storage system 15 (or memory). The computerized code includes instructions that are executed by the at least one CPU 12 to provide functions for modules 100, 101, and 102.

The parameter setting module 100 sets a maximum temperature $T_{max}$ of the CPU 12, and sets an initial cooling location, a swiveling angle, an initial rotational speed, a maximum rotational speed $N_{max}$, a preset cooling time, an increment of a rotational speed of the fan B. The $T_{max}$ is less than a critical temperature of the CPU 12, for example, if the critical temperature of the CPU 12 is 72°, the $T_{max}$ may be 70°. The initial rotational speed may be 30 percent of the max rotational speed $N_{max}$ of the fan B, for example, if the $N_{max}$ is 2000 revolutions per minute, the initial rotational speed may be 600 revolutions per minute. The preset cooling time of the fan B may be 1 minute. The rotational speed of the fan B may be incremented by 10 percent of the current rotational speed of the fan B, for example, if the current rotational speed is 600 revolutions per minute, the rotational speed may be incremented by 60 revolutions per minute ("the increment of rotational speed"), thus, an increased rotational speed is 600+60=660 revolutions per minute.

The temperature detection module 101 detects a first CPU temperature $T_{N1}$ using the thermal sensor 13, and determines whether the $T_{N1}$ is less than the $T_{max}$.

If the $T_{N1}$ is not less than the $T_{max}$, the fan control module 102 controls the fan B to swivel from an angle corresponding to the initial location (e.g., 30 degrees) to an angle corresponding to a new cooling location (e.g., 45 degrees) according to the swiveling angle (e.g., 15 degrees) of the fan B, to cool the CPU 12 according to the initial rotational speed, and calculates a cooling time of the fan B at the initial rotational speed. In one embodiment, as shown in FIG. 1, a location of the fan B is the new cooling location for heat dispersion of the CPU 12.

The temperature detection module 101 further detects a second CPU temperature $T_{N2}$ using the thermal sensor 13 if the cooling time of the fan B at the initial rotational speed is equal to the preset cooling time, and determines whether the $T_{N2}$ is less than the $T_{max}$.

If the $T_{N2}$ is not less than the $T_{max}$, the fan control module 102 increases the current rotational speed of the fan B according to the increment of rotational speed to obtain an increased rotational speed of the fan B, and determines whether the increased rotational speed is less than the $N_{max}$ of the fan B.

If the increased rotational speed is not less than the $N_{max}$ of the fan B, the fan control module 102 controls the fan B to cool the CPU 12 according to the $N_{max}$ until the temperature of the CPU 12 is less than the $T_{max}$.

If the increased rotational speed is less than the $N_{max}$, the fan control module 102 controls the fan B to cool the CPU 12 according to the increased rotational speed, and calculates a cooling time of the fan B at the increased rotational speed.

The temperature detection module 101 detects a third CPU temperature $T_{N3}$ using the thermal sensor 13, and determines whether the $T_{N3}$ is less than the $T_{max}$.

If the $T_{N3}$ is less than the $T_{max}$, the fan control module 102 decreases a current rotational speed of the fan B to be equal to the initial rotational speed, and controls the fan B to swivel from an angle corresponding to the new cooling location to the angle corresponding to the initial cooling location according to the swiveling angle of the fan B.

Figure 3:
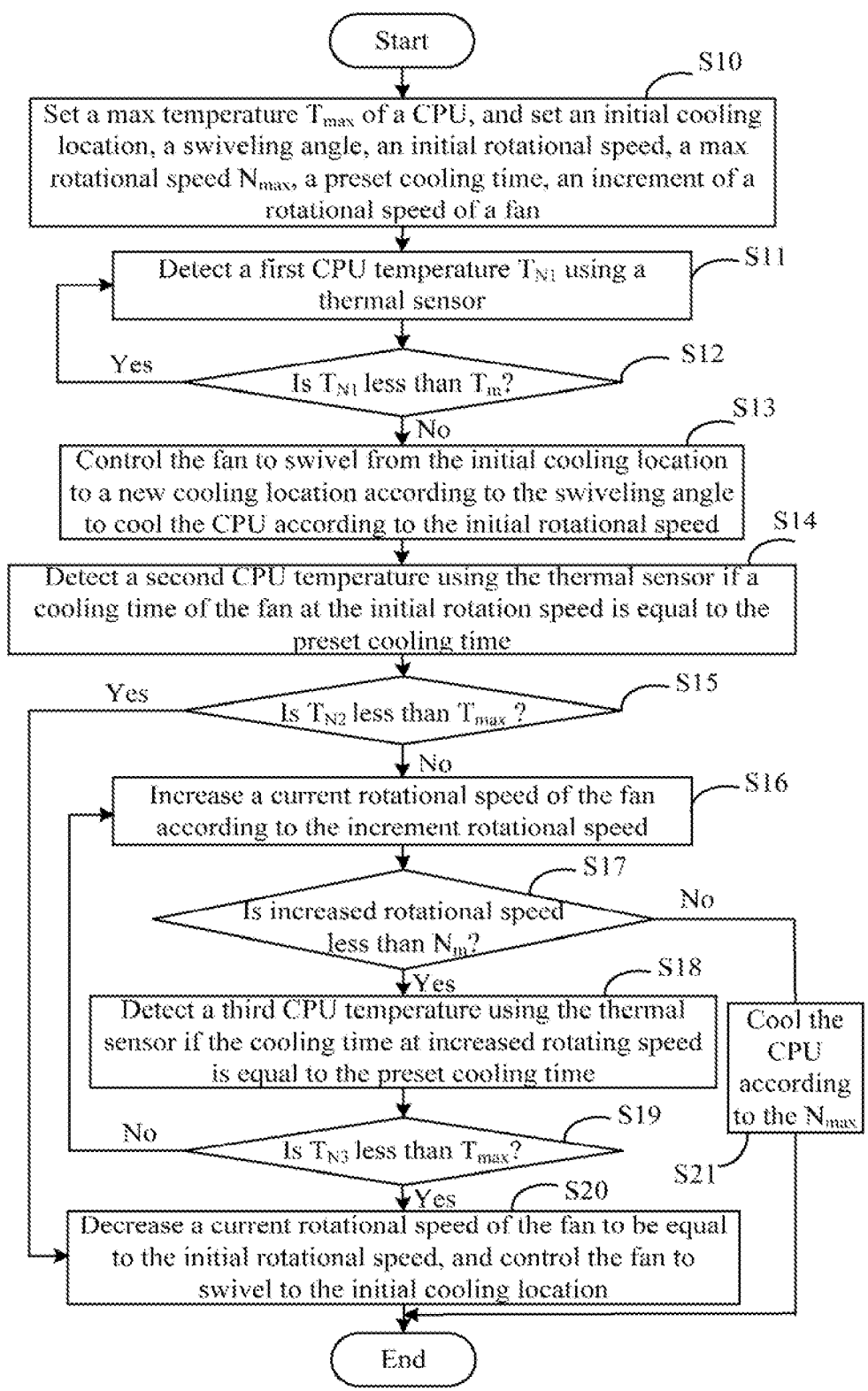
FIG. 3 is a flowchart of one embodiment of a method for controlling a temperature of a computing device.

FIG. 3 is a flowchart of one embodiment of a method for controlling a temperature of a computing device. Depending on the embodiment, additional blocks may be added, others removed, and the ordering of the blocks may be changed.

In block S10, the parameter setting module 100 sets a maximum temperature $T_{max}$ of the CPU 12, and sets an initial cooling location, a swiveling angle, an initial rotational speed, a maximum rotational speed $N_{max}$, a preset cooling time, an increment of rotational speed of the fan B.

In block S11, the temperature detection module 101 detects a first CPU temperature $T_{N1}$ using the thermal sensor 13.

In block S12, the temperature detection module 101 determines whether the $T_{N1}$ is less than $T_{max}$. If the $T_{N1}$ is less than the $T_{max}$, the procedure returns to the block S12.

If the $T_{N1}$ is not less than the $T_{max}$, in block S13, the fan control module 102 controls the fan B to swivel from an angle corresponding to the initial location to an angle corresponding to a new cooling location according to the swiveling angle of the fan B to cool the CPU 12 according to the initial rotational speed, and calculates a cooling time of the fan B at the initial rotational speed.

In block S14, the temperature detection module 101 detects a second CPU temperature $T_{N2}$ using the thermal sensor 13 if the cooling time of the fan B at the initial rotational speed is equal to the preset cooling time.

In block S15, the temperature detection module 101 determines whether the $T_{N2}$ is less than the $T_{max}$.

If the $T_{N2}$ is not less than the $T_{max}$, in block S16, the fan control module 102 increases the current rotational speed of the fan B according to the increment of rotational speed of the fan B to obtain an increased rotational speed of the fan B.

In block S17, the fan control module 102 determines whether the increased rotational speed is less than the N. If the increased rotational speed is less than the $N_{max}$, in block S21, the fan control module 102 controls the fan B to cool the CPU 12 according to the $N_{max}$.

If the increased rotational speed is less than the $N_{max}$ of the fan B, in block S18, the fan control module 102 controls the fan B to cool the CPU 12 according to the increased rotational speed, calculates a cooling time of the fan B at the increased rotational speed, and detects a third CPU temperature $T_{N3}$ using the thermal sensor 13.

In block S19, the fan control module 102 determines whether the $T_{N3}$ is less than the $T_{max}$ of the CPU 12. If the $T_{N3}$ is not less than the $T_{max}$, the procedure returns to the block S16.

If the $T_{N3}$ is less than the $T_m$, in block S20, the fan control module 102 decreases a current rotational speed of the fan B to be equal to the initial rotational speed, and controls the fan B to swivel from the angle corresponding to the new cooling location to the angle corresponding to the initial cooling location according to the swiveling angle of the fan B.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computing device, comprising:
   a storage system;
   a central processing unit (CPU);
   a thermal sensor to sense a CPU temperature of the CPU;
   a fan; and
   at least one processor to execute one or more programs stored in the storage system, the one or more programs comprising:
   a parameter setting module operable to set a maximum temperature Tmax of the CPU, and set an initial cooling location, a swiveling angle, an initial rotational speed, and a preset cooling time of the fan, and a maximum rotational speed Nmax and an increment of a rotational speed of the fan;
   a temperature detection module operable to detect a first CPU temperature TN 1 using the thermal sensor, and determine whether TN 1 is less than Tmax;
   a fan control module operable to control the fan to swivel from an angle corresponding to the initial location to an angle corresponding to a new cooling location according to the swiveling angle of the fan to cool the CPU according to the initial rotational speed if TN 1 is greater than Tmax, and calculate a cooling time of the fan at the initial rotational speed;
   the temperature detection module further operable to detect a second CPU temperature TN 2 using the thermal sensor if the cooling time of the fan at the initial rotational speed is equal to the preset cooling time, and determine whether TN 2is less than Tmax;
   the fan control module further operable to control the fan to swivel from the angle correspond to the new cooling location to the angle corresponding to the initial cooling location according to the swiveling angle of the fan if TN 2 is less than Tmax;
   the fan control module is further operable to increase a current rotational speed of the fan according to the increment of the rotational speed to obtain an increased rotational speed of the fan if TN 2 is greater than Tmax, determine whether the increased rotational speed is less than Nmax, and control the fan to cool the CPU according to the increased rotational speed if the increased rotational speed is less than Nmax;
   the temperature detection module is further operable to detect a third CPU temperature TN 3 using the thermal sensor if a cooling time of the fan at the increased rotational speed is equal to the preset cooling time; and
   the fan control module is further operable to decrease a current rotational speed of the fan to be equal to the initial rotational speed and control the fan to swivel from the angle corresponding to the new cooling location to the angle corresponding to the initial cooling location according to the swiveling angle of the fan if TN 3 is less than Tmax.

2. The computing device of claim 1, wherein, the fan control module is further operable to control the fan to cool the CPU according to Nmax until the temperature of the CPU is less than Tmax if the increased rotational speed is greater than the max rotational speed Nmax of the fan.

3. A computer-implemented method for control a temperature of a computing device, the computing device comprising a central processing unit (CPU), a thermal sensor and a fan, the method comprising:

setting a maximum temperature Tmax of the CPU, and setting an initial cooling location, a swiveling angle, an initial rotational speed, and a preset cooling time of the fan, and setting a maximum rotational speed Nmax and an increment of a rotational speed of the fan;

detecting a first CPU temperature TN 1 using the thermal sensor;

determining whether the TN 1 is less than Tmax;

controlling a fan of the computing device swivel from an angle corresponding to the initial location to an angle corresponding to a new cooling location according to the swiveling angle of the fan to cool the CPU according to the initial rotational speed if TN 1 is greater than Tmax, and calculating a cooling time of the fan at the initial rotational speed;

detecting a second CPU temperature TN 2 using the thermal sensor if the cooling time of the fan at the initial rotational speed is equal to the preset cooling time;

determining whether TN 2 is less than Tmax;

controlling the fan to swivel from the angle corresponding to the new cooling location to the angle corresponding to the initial cooling location according to the swiveling angle of the fan if TN 2 is less than Tmax;

increasing the current rotational speed of the fan according to the increment of rotational speed to obtain an increased rotational speed of the fan if TN 2is greater than Tmax:

determining whether the increased rotational speed is less than Nmax;

controlling the fan to cool the CPU according to the increased rotational speed if the increased rotational speed is less than Nmax;

detecting a third CPU temperature TN 3 using the thermal sensor if a cooling time of the fan at the increased rotational speed is equal to the preset cooling time;

decreasing a current rotational speed of the fan to be equal to the initial rotational speed and controlling the fan to swivel from the angle corresponding to the new cooling location to the angle corresponding to the initial cooling location according to the swiveling angle of the fan if TN 3 is less than Tmax.

4. The method of claim 3, further comprising:

controlling the fan to cool the CPU according to Nmax until the temperature of the CPU is less than Tmax if the increased rotational speed is greater than Nmax.

5. A storage medium having stored thereon instructions that, when executed by a processor of a computer, causes the computer to perform a method for controlling a temperature of a computing device, the computing device comprising a central processing unit (CPU), a thermal sensor and a fan, the method comprising:

detecting a first CPU temperature TN 1 using the thermal sensor;

determining whether the TN 1 is less than Tmax;

controlling a fan of the computing device swivel from an angle corresponding to the initial location to an angle corresponding to a new cooling location according to the swiveling angle of the fan to cool the CPU according to the initial rotational speed if TN 1 is greater than Tmax, and calculating a cooling time of the fan at the initial rotational speed;

detecting a second CPU temperature TN 2 using the thermal sensor if the cooling time of the fan at the initial rotational speed is equal to the preset cooling time;

determining whether TN 2 is less than Tmax;

controlling the fan to swivel from the angle corresponding to the new cooling location to the angle corresponding to the initial cooling location according to the swiveling angle of the fan if TN 2 is less than Tmax;

increasing the current rotational speed of the fan according to the increment of rotational speed to obtain an increased rotational speed of the fan if TN 2 is greater than Tmax:

determining whether the increased rotational speed is less than Nmax;

controlling the fan to cool the CPU according to the increased rotational speed if the increased rotational speed is less than Nmax;

detecting a third CPU temperature TN 3 using the thermal sensor if a cooling time of the fan at the increased rotational speed is equal to the preset cooling time;

decreasing a current rotational speed of the fan to be equal to the initial rotational speed and controlling the fan to swivel from the angle corresponding to the new cooling location to the angle corresponding to the initial cooling location according to the swiveling angle of the fan if TN 3 is less than Tmax.

6. The medium of claim 5, further comprising:

controlling the fan to cool the CPU according to Nmax until the temperature of the CPU is less than Tmax if the increased rotational speed is greater than Nmax.

* * * * *